United States Patent [19]

Widhopf

[11] Patent Number: 4,813,346
[45] Date of Patent: Mar. 21, 1989

[54] WORT COOKING ARRANGEMENT

[75] Inventor: Martin Widhopf, Freising-Pulling, Fed. Rep. of Germany

[73] Assignee: Anton Steinecker Maschinenfabrik GmbH, Freising, Fed. Rep. of Germany

[21] Appl. No.: 120,107

[22] Filed: Oct. 26, 1987

[30] Foreign Application Priority Data

Oct. 27, 1986 [DE] Fed. Rep. of Germany ....... 3636491

[51] Int. Cl.$^4$ ................................................. C12C 7/00
[52] U.S. Cl. ......................................... 99/278; 99/276; 165/160
[58] Field of Search ...................... 99/276, 277, 277.1, 99/277.2, 278, 323.1; 426/520; 165/160, 145

[56] References Cited

U.S. PATENT DOCUMENTS

| 4,204,573 | 5/1980 | Clark | 165/160 X |
| 4,336,770 | 6/1982 | Kaneko | 165/160 X |
| 4,388,857 | 6/1983 | Korek | 99/276 |
| 4,421,162 | 12/1983 | Tollar | 165/140 |
| 4,483,881 | 11/1984 | Lenz | 99/276 X |
| 4,694,896 | 9/1987 | Navratil | 165/160 X |

FOREIGN PATENT DOCUMENTS

| 1158706 | 6/1958 | France | 165/160 |
| 1383330 | 2/1975 | United Kingdom | 99/276 |
| 2175006 | 11/1986 | United Kingdom | 99/276 |

Primary Examiner—Philip R. Coe
Assistant Examiner—K. L. O'Leary
Attorney, Agent, or Firm—Scully, Scott, Murphy & Presser

[57] ABSTRACT

A wort cooking or boiling arrangement, which operates with vapor concentration, including a wort cauldron or kettle and with two separate heating circuits which are located externally of the wort cauldron and which are formed by heat exchangers. One of the heat exchangers (live steam heat exchanger) is supplied with live stem for the heating of the worts, and the other heat exchanger (vapor heat exchanger) is supplied with concentrated vapors for the subsequent cooking or boiling of the worts. The two heat exchangers are located in each other within a common external cooker.

12 Claims, 4 Drawing Sheets

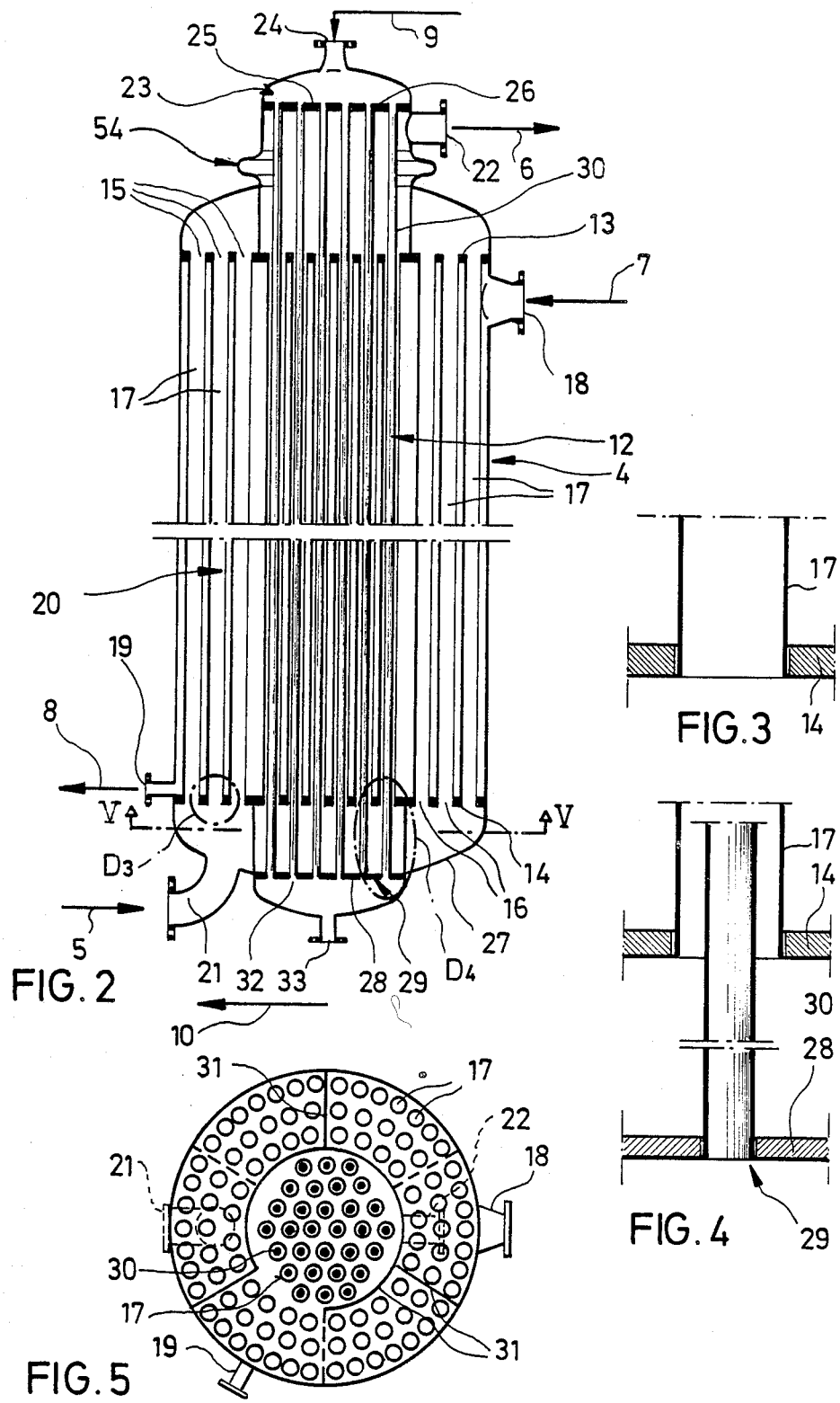

WORT COOKING ARRANGEMENT

BACKGROUND OF THE INVENTION

1. Field of the Invention

The present invention relates to a wort cooking or boiling arrangement, which operates with vapor concentration, including a wort cauldron or kettle and with two separate heating circuits which are located externally of the wort cauldron and which are formed by heat exchangers, wherein the one heat exchanger (live steam heat exchanger) is supplied with live steam for the heating of the worts, and the other heat exchanger (vapor heat exchanger) is supplied with concentrated vapors for the subsequent cooking or boiling of the worts.

2. Discussion of the Prior Art

More recently, it has become known that for the required cooking of the worts during a brewing process, operation may be effectuated with so-called vapor concentrating installations, wherein heat pumps serve for the transport of energy. The foregoing relates to an open process, whereby the vapors which are produced during the boiling down of the worts are aspirated and concentrated. During the subsequent condensation, the vapors again transfer their heat to the worts, and are then separated out of the system in the form of a liquid.

Through the direct utilization of the heat of the vapors for the wort cooking or boiling process, the resultant waste heat and the heat consumption are in a direct interrelationship. As a result thereof, it is possible to remove the vapors. Any need for an interim storage of the waste heat is obviated. The necessary energy demand reduces itself hereby to the balancing between the radiation losses and the work which is necessary for the heat transport.

Moreover, it is also known in the current state-of-the-technology, that the heating and cooking of the worts can be carried out with two separate heating installations. In one of the heating installations, the worts are initially heated with live steam, whereas during cooking or boiling they are then subjected to pressurized vapors.

For the preheating of the worts with the aid of live steam, heretofore operations were carried out either through the intermediary of heating devices installed on the boiler, an internal or external cooker; however, while the worts were in every instance conveyed through an external cooker for cooking, inasmuch as one was required to operate with low heating-steam pressures, such that because of the concentrated vapors, greater than average-sized heating surfaces were required.

The operation with two separate heating circuits, one for live steam and one for concentrated vapors, is based in a first instance on the concept that, due to the separation of the heating circuits, the condensate from the live steam can be reused; in essence, there is precluded any contamination of the boiler and condensate system caused by vapor constituents.

Previously known systems, which operate with two separate heating installations, have implemented the foregoing, in that there were provided two separate and adjacently arranged, in effect, sequentially-connected external cookers whereby, initially, the worts were heated with live steam in a first external cooker. Thereafter the worts were conducted out of the first external cooker, and introduced into the second external cooker, so that a heat exchange took place for cooking with concentrated vapors. At a lower discharge of the two cookers there could be further employed the respective condensates, for example, for the preparation of warm water.

Through the external heating and cooking in two separate, successively arranged external cookers, the necessary demands on installation (piping, insulations, material consumption), as well as the operating demands (safety reinforcements) are relatively extensive.

SUMMARY OF THE INVENTION

Accordingly, it is an object of the present invention to propose a wort cooking arrangement of the above-mentioned type, which inherently contemplates a significantly reduced demand on material construction and operation in comparison with installations which are presently known in the state-of-the-technology.

The foregoing is achieved through the utilization of a wort cooking arrangement of the above-mentioned type, in that the two heat exchangers are located in each other within a common external cooker.

The two heat exchangers which are located in each other, preferably concentrically, within a common external cooker, provide for an entire series of advantages. Firstly, this eliminates the previously necessary pipelines connecting the two separate heat exchangers, and thereby also the pipeline vents required for this purpose. Furthermore, for the one external cooker there is required only one safety jacket. In sequentially connected boilers there are encountered sealing problems, which have also been eliminated through the present invention. In addition thereto, it is necessary to provide only a single foundation and only one supporting arrangement. Through the elimination of a second external cooker there is, resultingly, also eliminated one framework and the necessary insulation.

Through these advantages which pertain to the demands on production, installation and space, by means of the invention, the live steam can also be employed in a more regulated and improved manner, especially as a consequence thereof, and the wort can be continuously cooked with live steam and vapor in a cooker. The positioning of the heat exchangers in each other within the one external cooker further leads to an improved degree of efficiency, inasmuch as there are eliminated the convection or radiation losses of the inner cooker.

An advantageous modification of the invention contemplates that the external cooker be constructed as an upstanding, elongated round or circular container, having an inlet at its lower end and outlet at its upper end for the worts, whereby the worts along their path of travel from the inlet towards the outlet come into contact with the heat exchanging surfaces of the two heat exchangers. Through these measures, the incoming worts flow through the external boiler upwardly from below, and are thereby heated passing along the heat exchanger surfaces, in accordance as to whether one is operating with live steam or with concentrated vapor or with both.

A further embodiment of the invention contemplates that the container be provided in its upper region with a first, upper and horizontally extending partition wall and in its lower region with a first, lower and horizontally extending partition wall, whereby the partition walls bound a middle chamber or space, and in which a large number of openings are present in the partition walls, whereby from respectively one opening in the first, upper partition wall, a wort conduit extending through the middle space for the through-passage of the worts, leads to a corresponding opening in the first, lower partition wall.

The partitioning of the container by means of the partition walls creates a real capability of arranging separate heating circuits or, in effect, respectively the two heat exchangers separately from each other, in one external cooker. Through the separation of the container in a manner forming a middle or central space, which is traversed by conduits or pipelines through which the worts pass, there is obtained the capability to introduce, for example, vapor into the upper region of the middle space through a side inlet opening, and then to withdraw it from the lower region through a side discharge opening in the form of vapor condensate. Hereby, the vapor circulates about the wort conduits in this middle chamber or space, and cannot exit further upwardly through the upper partition wall and further downwardly through the lower partition wall within the container. In this manner and type there is effectuated a closed vapor heat exchanger within the external cooker.

Pursuant to a further embodiment of the invention, the second heat exchanger is produced in that the container is equipped with a second upper partition wall above the first upper partition wall, and with a second lower partition wall below the first lower partition wall, both of which second partition walls extend horizontally, live steam conduits extending between corresponding openings in the two second partition walls, the conduits passing through the middle space within the wort conduits at a smaller diameter than these wort conduits or pipelines.

In conjunction therewith, it is also advantageous when the upper second partition wall extends above the connection of the discharge for the worts and the second lower partition wall extends below the connection of the inlet for the worts.

In an actual embodiment, the second upper partition wall and the wort inlet are located in a container headpiece, so as to facilitate a simple installation of the partition wall.

A further embodiment contemplates that the container be closed off at its lower end by the second lower partition wall, whereby a downwardly extending condensate collecting chamber with a condensate discharge connects to the bottom of the partion wall. Thereby, the second lower partition wall forms the container bottom at least a part of the container width, which similarly leads to an easier installation of this partition wall. Connected to extend downwardly in the type of an attachment is the condensate collecting chamber, into which there connect the live-steam pipelines or conduits. From the condensate collecting chamber, the condensate can flow out through a condensate discharge provided for this purpose, such that the live steam, from its inlet to its discharge from the container, will not come into any contact with the vapor condensate, and can thereby be further utilized.

Another advantageous embodiment contemplates that vertically oriented guide walls be provided in the container, which are so arranged that the worts will pass along the longest possible path of travel from the wort inlet opening to the wort discharge opening. As a result thereof, there is increased the effective heating and cooking path for the worts.

With respect to a realistic object, it is also presently contemplated that the diameter of the two second partition walls each correspond to about one-half the diameter of the two first partition walls, and that the container headpiece, and the condensate collecting chamber are arranged symmetrically relative to the longitudinal center axis of the container. Thereby, the two heat exchangers are arranged rotationally-symmetrical with respect to the longitudinal center axis, so as to produce a uniform action on the through-flowing worts by both heat exchangers.

Finally, it is further contemplated that the wort conduits and the live-steam conduits or pipelines be constructed from round pipes or tubes, and it is additionally contemplated that the bottom of the live-steam condensate collecting chamber is dished. In this manner and type there are avoided the formations of dead corners or spaces, and it is achieved that the condensate can be discharged without any substantial residues remaining in the container.

Pursuant to another inventive configuration it is contemplated that an attachment is formed at the lower end of the external cooker, which extends with a cylindrical jacket surface up to the lower partition wall into the external cooker, whereby the attachment is horizontally subdivided through an upper baffle and a lower baffle, and is equipped with a live-steam inlet and a live-steam condensate discharge.

With respect to the foregoing, the infeed of the live steam, as well as the discharge of the live-steam condensate is implemented at the lower end of the container. Servicing this purpose is a suitably configured attachment, which is subdivided through two partition walls. The space between the two partition walls serves as a live-steam condensate collecting chamber, while live steam is introduced into the lower space located below the lower partition wall. Due to this configuration there is eliminated any separate formation of an attachment at the upper end of the container. At that location there must be merely provided a wort discharge opening.

In accordance with the first exemplary embodiment, there is additionally obtained the advantage that the compensator which is arranged on the upper headpiece can be eliminated. This can be based on that because of the spatially combined discharge of the live steam condensate and the infeed of the live steam, due to the relatively low temperature differentials between the steam and the condensate there are not encountered any such high temperature differences. Consequently, for this embodiment, no compensation is necessary. Moreover, the baffles, and especially the upper baffle, can be formed from a relatively thin sheet metal, inasmuch as there are no appreciable pressure differentials present between these baffles. The arrangement of the headpiece or attachment, in general, facilitates the assembly, as well as also the inspection and servicing of the external cooker.

In this connection, a further embodiment of the invention contemplates that the upper baffle be provided with openings which are located concentrically relative to openings in the lower partition wall, and wherein associated live-steam condensate collector tubes terminate at the respective openings, which tubes presently extend upwardly through the pipelines or conduits at a radial spacing, whereby the tubes end in the region of the upper partition wall and are closed at that location.

The lower baffle is provided with openings which are located concentrically with the openings in the upper baffle, and provision is made that associated live-steam conduits terminate at the openings, wherein the conduits extend upwardly through the live-steam condensate collector conduits at a radial spacing therewith. The live-steam conduits are open at the upper ends, and terminate at a distance from the upper ends of the live-steam condensate collector conduits. By means of this arrangement, operation is carried out with three conduits which are arranged within each other, wherein the worts are conducted between the outermost conduit and the therein located live-steam condensate collector conduit. Located within the live-steam condensate collector conduit is a further upwardly opening live-steam conduit or pipeline, through which the live steam is introduced from the bottom and then exits from the upper end. Inasmuch as the live-steam condensate collector conduit surrounds the live-steam conduit and is closed at its upper end, the live steam is reversed after exiting from the live-steam conduit, condensed and then travels again downwardly within the live-steam condensate collector conduit into the live-steam condensate collecting conduit which is formed between the two baffles, from which it is then discharged through an opening.

BRIEF DESCRIPTION OF THE DRAWINGS

Reference may now be made to the following detailed description of exemplary embodiments of the invention, taken in conjunction with the accompanying drawings; in which:

FIG. 2 illustrates a longitudinal sectional view through the inventive external cooker;

FIG. 3 illustrates a detail from the encircled portion $D_3$ in FIG. 2;

FIG. 4 illustrates a detail from the encircled portion $D_4$ in FIG. 2;

FIG. 5 illustrates a bottom plan view of the external cooker shown along the section line IV—IV in FIG. 2;

DETAILED DESCRIPTION OF THE PREFERRED EMBODIMENTS

Figure 1:
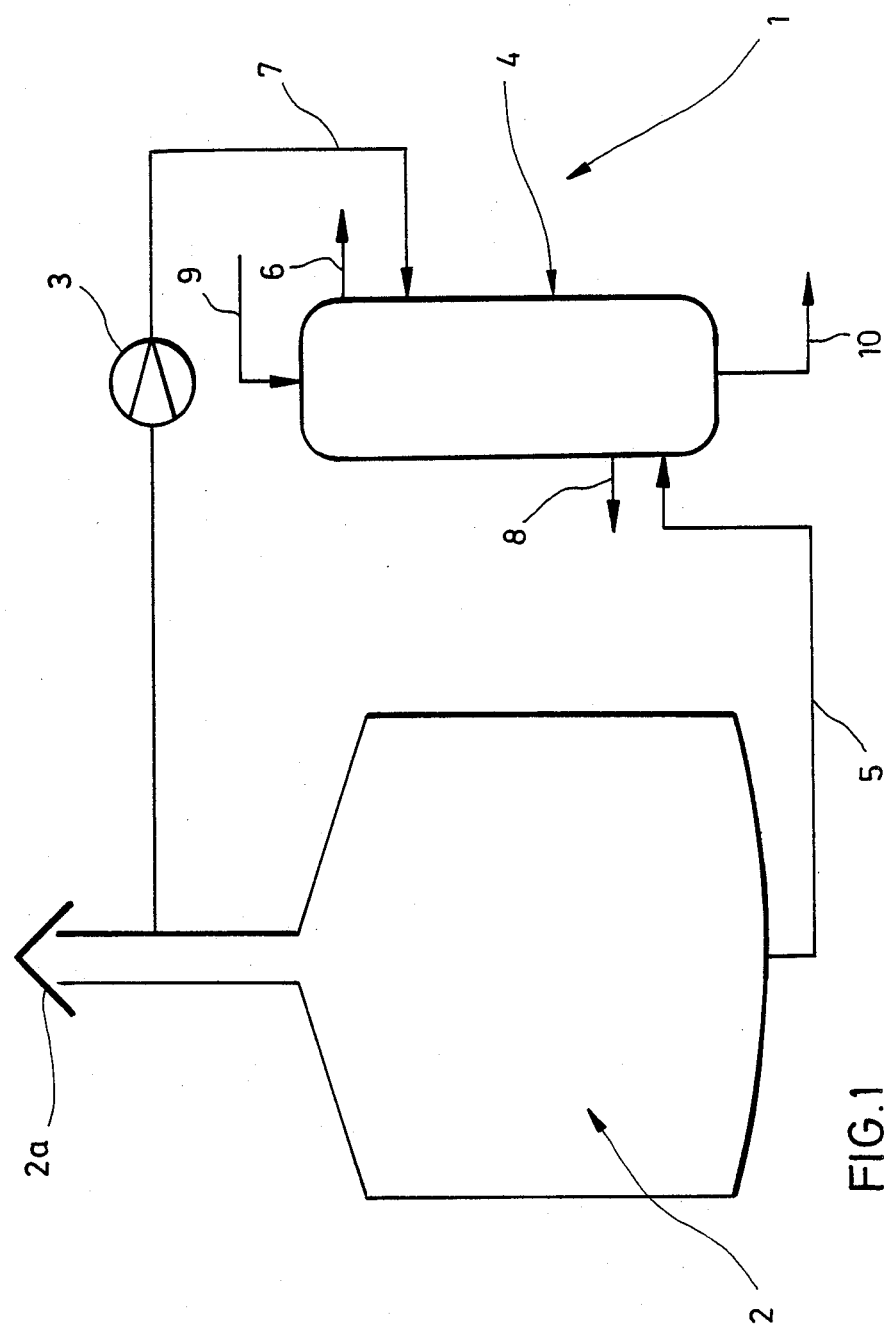
FIG. 1 illustrates a schematic representation of the inventive wort cooking arrangement.

In FIG. 1, there is illustrated, in principle, the arrangement of the inventive wort boiling or cooking installation. The wort cooking installation is generally identified by reference numeral 1, and encompasses a wort cooker 2 which is in communication, through different connecting conduits or pipelines, with an external cooker 4. In the external cooker 4, the worts, such as brewer's worts, are heated, as well as boiled or cooked. For this purpose, the worts are introduced into the external cooker through the conduit 5, and exit from the cooker at the upper end thereof through the conduit 6.

A live-steam inlet conduit 9 leads to the external cooker 4, through which live steam can be introduced for the heating of the worts in the external cooker 4. The live steam condensate exits from the external cooker through the discharge conduit 10. In a manner as explained in detail hereinbelow, the live steam flows through the external cooker 4 within its own conduit pipeline system. Moreover, the external cooker 4 is in communication with an inlet conduit 7 through which, with the aid of a compressor or condenser 3, concentrated vapors can be introduced into the external cooker. The vapor condensate exits from the external cooker 4 through the discharge conduit 8.

The manner in which the separate heat circuits effectuated in the external cooker 4 or, in effect, the two heat exchangers, on the one hand, for live steam, and on the other hand, for the condensed vapors in the external cooker 4, is shown in the longitudinal section of FIG. 2, as elucidated hereinbelow.

As can be ascertained from FIG. 2 in conjunction with FIG. 5, the external cooker 4 is constructed as an elongate upright round container. In the interior thereof, the container is firstly provided in the upper region above the inlet opening 18 for the concentrated vapors with a horizontally extending partition wall 13. A corresponding first lower partition wall 14 is arranged in the lower region of the container 4 below the discharge opening 19 for the vapor condensate. These two first partition walls 13 and 14 separate a middle space or chamber 20 within the container from the upwardly and lower adjoining spaces. Provided in the upper partition wall 13 are through-openings 15, and in the lower partition wall 14 corresponding openings 16. The openings 15 and 16 are connected with each other through pipe conduits 17. These pipe conduits 17 facilitate that the worts, which are introduced through the conduit 5 and the inlet opening 21 at the lower portion of the container, to be able to flow through the partition walls 14 or 13 into the conduits 17. The worts which then flow therethrough are boiled or cooked, when concentrated vapors are introduced into the middle space 20 through the inlet opening 18. These vapors circulate about the conduits 17, thereby giving up heat, condense and again exit from the external cooker 4 through the discharge opening 12. In this manner, there is realized the vapor heat exchanger 11.

The container 4 further possesses a container headpiece 23 at its upper end, on which there is formed the wort discharge opening 22. Arranged above the wort discharge opening 22 is a second upper partition wall 25 which, in turn, is also provided with openings 26. The container headpiece is provided with a compensator 54 for the compensation of different expansions.

The container bottom 27 is closed off towards the bottom by a second, lower partition wall 28 across a region which is symmetrical relative to the longitudinal center axis A of the external cooker 4, whereby openings 32 are similarly provided in the second lower partition wall 28. Also extending between the openings 26 in the second upper partition wall 25 and the openings 32 in the second lower partition wall 28 are pipe conduits 30, which are passed through by live steam, which is introduced through the conduit 9 and the live steam inlet 24 at the upper end of the container headpiece 23, thereby condenses and collects as live-steam condensate in the condensate collecting chamber 29 downwardly adjoining the lower partition wall 28. The live-steam condensate is then introduced through the discharge 33 into the condensate conduit 10.

In FIG. 3, there can be ascertained from the detail representation $D_3$, that the wort conduits 17 are fastened in the openings of the lower partition wall 14. The corresponding aspect is applicable to the upper partition wall 13.

As can be further ascertained from FIG. 4, the wort pipeline conduits 17, which extend within the inner part of the external cooker 4, are passed through by the live-steam conduits 30. The diameters of the live-steam conduit 30 are so dimensioned that the worts can also flow without any excessive flow resistance through the wort conduits 17 which are traversed by the live-steam conduits 30.

Through the separating structure which is formed with the aid of the second partition walls 25 and 28 and the live-steam conduits extending between these partition walls, there is produced the second heat exchanger 12 whereby the heating medium, namely the live steam, will flow through the conduits or pipes 30 so as to pass through the external cooker within its own heating circuit, without contacting with the vapor condensate, such that the live-steam condensate, which is obtained through the conduit 10, can be further utilized.

In FIG. 5, there can be further ascertained that in the external cooker 4 there are also present vertically directed guide walls 31, which guide the worts entering at the inlet 21 to travel along the longest possible path through the external cooker 4. Because of the arrangement of the heat exchangers so as to be located concentrically within each other, the guide walls can be simply arranged and manufactured, inasmuch as there can be employed identical components.

The inventive wort cooking installation can be operated as follows:

The heating of the worts is carried out by the pumping of the worts into the cooker 4 from the cauldron or kettle 2 with the aid of a pump (not shown). In the external cooker 4, live steam 9 is introduced through the conduit 9 and the inlet 24, which steam will then uniformly flow downwardly through the conduits 30, give up its heat to the worts, and thereby condense. The live-steam condensate collects in the condensate collecting chamber 29 and exits through the conduit 10 from the external cooker, and then can be further utilized. The heated worts are then reconveyed to the kettle 7 through the discharge 6, and circulate for so long between the external cooker 4 and the kettle 2 until they have about reached a boiling temperature. Through the increasing heating of the worts there are produced vapors in the kettle 2. At an adequate presence of vapors in the kettle 2, the compressor 3 will activate, and the vapor blow-off valve 2a in the kettle 2 will close. The vapors which have been concentrated with the aid of the compressor 3 are introduced through the conduit 7 into the external cooker 4, and then take over the heating of the further circulating worts. The concentrated vapor condenses during circulation about the wort conduits 7 in the middle space 20 of the external cooker 4. The vapor condensate can then be withdrawn through the discharge 19 and the conduit 8, and can be further employed, for example, for the preparation of warm water or the like.

Figure 6:
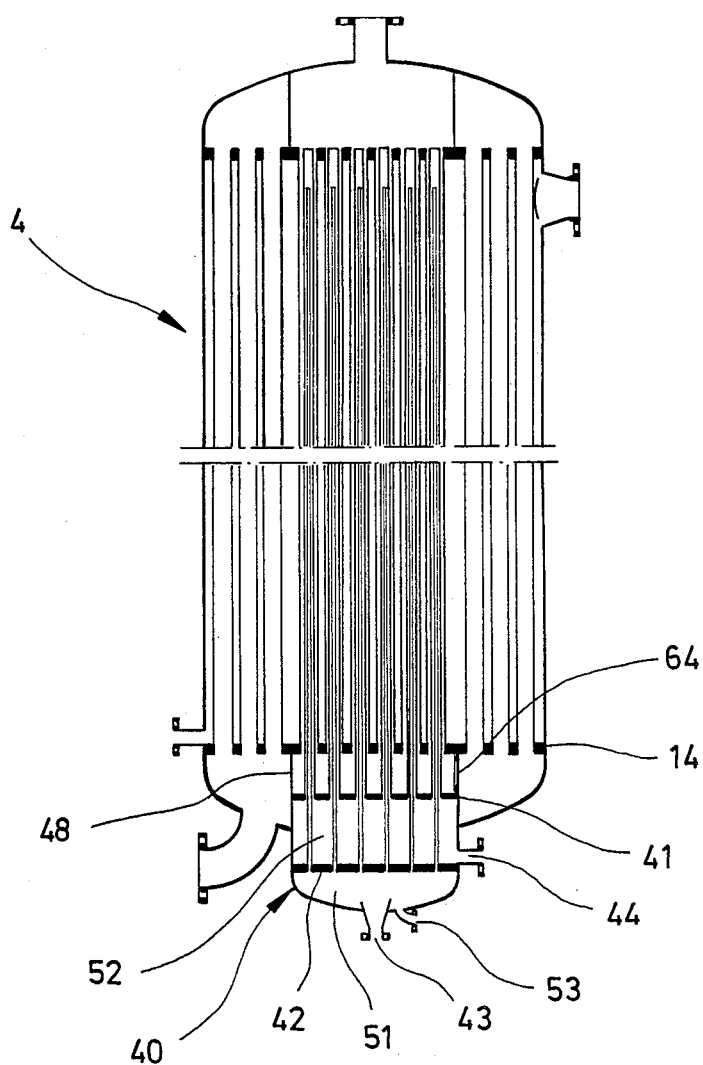
FIG. 6 illustrates a longitudinal sectional view through a further embodiment of the inventive external cooker.

In FIG. 6, there is illustrated a further exemplary embodiment of an external cooker 4. In this external cooker, the live-steam infeed as well as the discharge of the live-steam condensate takes place with the aid of an attachment 40 which is arranged at the lower end of the container. This attachment projects with a cylindrical jacket surface 48 from below through the container bottom up to the lower partition wall 14, and is sealingly fastened to the periphery of the partition wall 14. Located in the attachment is an upper baffle 41, as well as a lower baffle 42. Below the lower baffle 42, the attachment 40 is closed off and is provided with a live-steam inlet 43. Openings 45 are formed in the upper baffle 41, which are located concentrically with the openings 16 in the lower partition wall 14 (referring to FIG. 7). These condensate collector conduits 46, presently extend into the associated pipelines or conduits 17, and end approximately in the region of the upper partition wall 13. At the upper end 50, the live-steam condensate collector conduits 46 are closed off.

In the lower baffle 42 there are provided openings which are similarly concentric with the respective openings 45 and 16 in the upper baffle and the lower partition wall, openings, in which openings there begin live-steam conduits 47 which extend into the condensate conduits 46 and terminate at a distance A from the upper end 50 of the live-steam condensate collector conduits.

The diameters of the pipes or conduits which extend into each other are so selected as to provide between the conduits 17 and the neighboring inwardly located live-steam condensate conductor tube 46 a sufficient radial spacing $R_1$, and in just the same manner between the live-steam conduits 47 and the live-steam condensate conduits tube 46 a sufficient radial spacing $R_2$, so as to render possible a corresponding through-passage of the worts and, respectively, of the live-steam condensate.

Figure 7:
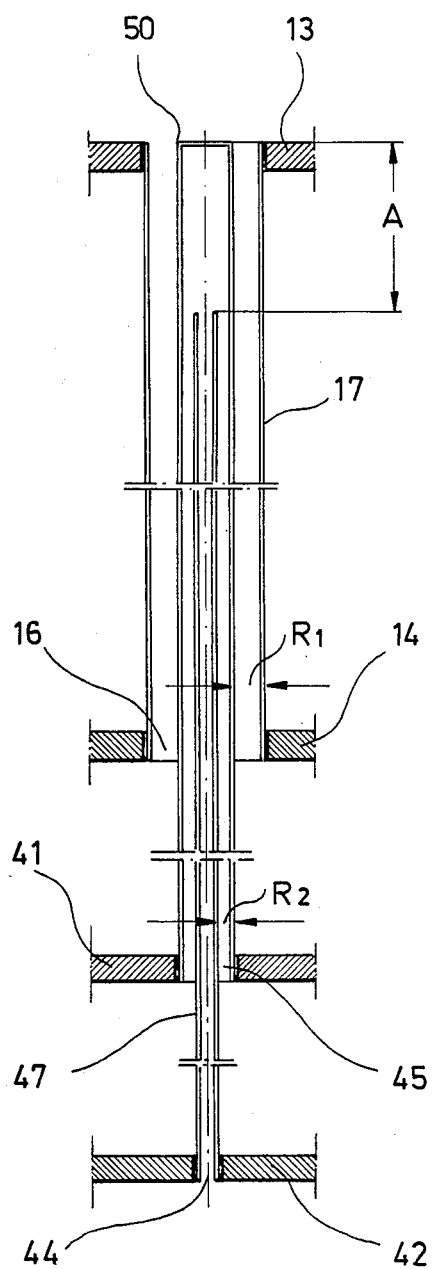
FIG. 7 illustrates a longitudinal sectional view through a single pipeline or conduit system of the external cooker which is shown in FIG. 6.

The operation of the external cooker of FIGS. 6 and 7 is effected analogously with the mode of operation described with respect to the first exemplary embodiment; however, live-steam is introduced herein from the bottom through the opening 43. The live-steam is hereby distributed within the space 51 and enters uniformly from below through the openings 49 into the live-steam conduits tubes 47. There it then rises up to the upper open ends of the respective live-steam conduits and is reversed by the closed end 50 of the live-steam condensate collector conduits whereby the live-steam condensate will enter between the outer wall of the live-steam conduits 47 and the inner wall of the live-steam condensate collector conduits to flow downwardly into the condensate collecting chamber 52 which is located between the upper baffle 41, and the baffle 42. Provided therein at one side is live-steam condensate discharge 44, through which the condensate can exit. Arranged in the live-steam distributing chamber 51 is a further live-steam condensate discharge 53 in order to be able to discharge the condensed live-steam also at that location.

The heating of the worts is then carried out in an analogous manner with that in the first described exemplary embodiment, in that the worts pass through between the conduits 17 and the live-steam condensate conduits 46 of the external cooker, and are thereby heated. The worts which collect between the lower partition wall 14 and the upper baffle 41 exit from one side through suitable openings 64 from the cylindrical jacket of the attachment 14 into the radially outer portion of external cooker.

Naturally, it is readily apparent that the inventive external cooker need not be only arranged in an upright orientation, but it can also be utilized in a horizontally lying direction.

What is claimed is:

1. A wort cooking arrangement which operates under vapor concentration; comprising a wort cauldron and two separate heating circuits positioned externally of the wort cauldron which are formed by heat exchangers, a first one of said heat exchangers being supplied with live-steam for the heating of the worts, and the second heat exchanger being supplied with concentrated vapor for the cooking of the worts, said first and second heat exchangers being arranged so as to be located within each other in a common external cooker, the external cooker comprising an elongate round container, an inlet for worts at a lower end and a discharge for worts at an upper end of said container; and heat exchanger surfaces of said first and second heat exchangers being contacted by said worts along the path of travel of said worts from the inlet to the discharge; the external cooker including a first upper and horizontally extending partition wall in the upper region, and a first lower and horizontally extending partition wall in the lower region, said partition walls bounding a middle space in said cooker, a plurality of openings in said partition walls; and a wort conduit leading from each opening the first upper partition wall to a corresponding opening in the first lower partition wall and extending through the middle space for the passage therethrough of the worts; wherein an attachment is formed at one end of the external cooker, said attachment having a cylindrical jacket surface extending up to the lower first partition wall in the external cooker, said attachment including an upper baffle and a lower baffle subdividing said attachment; and said attachment includes a live-steam inlet and a live-steam condensate discharge.

2. An arrangement as claimed in claim 1, wherein the upper region of the middle space includes a side inlet opening for the vapor, and the lower region of the middle space includes a side discharge opening for the vapor condensate.

3. An arrangement as claimed in claim 1, wherein the external cooker includes a second horizontal upper partition wall above said first upper partition wall, and a second horizontal lower partition wall below said first lower partition wall; and live-steam conduits extending between corresponding openings in said two second partition walls, said conduits extending through the middle space within said wort conduits with smaller diameters than the wort conduits.

4. An arrangement as claimed in claim 3, wherein the upper second partition wall is located above the connection of the discharge for the worts and the second lower partition wall extends below the connection of the inlet for the worts.

5. An arrangement as claimed in claim 3, wherein said external cooker includes a container headpiece at the upper end thereof having said second upper partition wall and the wort discharge opening arranged therein.

6. An arrangement as claimed in claim 3, wherein the external cooker has a lower end closed off by the second lower partition wall; and a condensate collecting chamber with a condensate discharge extending below and being connected downwardly to said partition wall.

7. An arrangement as claimed in claim 6, wherein the bottom of the condensate collecting chamber for the live-steam is of a dished configuration.

8. An arrangement as claimed in claim 3, wherein the diameter of each of the two second partion walls is about one-half the diameter of each of the two first partition walls, the container headpiece and the condensate collecting chamber being arranged to extend symmetrically about the longitudinal center axis of the container.

9. An arrangement as claimed in claim 3, wherein the wort conduits and the live-steam conduits are constituted from round tubes.

10. An arrangement as claimed in claim 1, wherein vertically oriented guide walls are positioned in the external cooker, said guide walls being positioned to cause the worts to traverse an extended path of travel between the wort inlet and the wort discharge.

11. An arrangement as claimed in claim 1, wherein the upper baffle has openings therein which are located concentrically relative to the openings in the lower first partition wall, said openings receiving the ends of associated live-steam condensate collector conduits which extend upwardly through the wort conduits at a radial spacing therebetween; the live-steam condensate collector conduits ending and being closed in the region of the upper first partition wall.

12. An arrangement as claimed in claim 11, wherein the lower baffle includes openings which are located concentrically with the openings in the upper baffle, wall and associated live-steam conduits ending at the respective openings, said conduits extending within the live-steam condensate collector conduits at a radial spacing therebetween, the live-steam conduits being open at their upper ends and terminating at a distance from the upper end of the live-steam condensate collector conduits.

* * * * *